United States Patent [19]

Maeba et al.

[11] Patent Number: 4,841,425
[45] Date of Patent: Jun. 20, 1989

[54] HIGH-VOLTAGE POWER SUPPLY APPARATUS

[75] Inventors: Yukio Maeba; Kiyoteru Igashira, both of Nagaokakyo, Japan

[73] Assignee: Murata Manufacturing Co., Ltd., Japan

[21] Appl. No.: 55,188

[22] Filed: May 28, 1987

[30] Foreign Application Priority Data

May 30, 1986 [JP] Japan ............................. 61-83529[U]
May 30, 1986 [JP] Japan ............................. 61-83530[U]

[51] Int. Cl.$^4$ ......................................... H02M 3/335
[52] U.S. Cl. ............................... 363/21; 323/267; 307/35; 361/235
[58] Field of Search ............................ 363/20, 21, 97; 323/267, 281; 307/33, 35; 361/235; 355/3 CH, 14 CH

[56] References Cited

U.S. PATENT DOCUMENTS

| 3,961,237 | 6/1976 | Tyler | 323/267 |
| 3,986,085 | 10/1976 | Weber | 363/20 X |
| 4,500,830 | 2/1985 | Gotou et al. | 323/267 |
| 4,747,012 | 5/1988 | Maeba et al. | 363/21 X |

FOREIGN PATENT DOCUMENTS

| 0077372 | 6/1980 | Japan | 363/21 |
| 0083909 | 6/1980 | Japan | 323/267 |

Primary Examiner—Patrick R. Salce
Assistant Examiner—Kristine Peckman
Attorney, Agent, or Firm—Ostrolenk, Faber, Gerb & Soffen

[57] ABSTRACT

A high-voltage power supply apparatus includes a transformer, and an input winding is turned on and off repeatedly by a switching element, and thereby an alternating current (AC) is generated in the input winding. By varying the duration of a turned-on state or a turned-off state of the switching element, an output voltage from the output winding of the transformer is regulated. A series connection of a first resistor and a transistor is connected between one end of the output winding and a reference potential. A second resistor is connected in parallel with the series connection. A medium voltage circuit is connected through a diode between the other end of the output winding and the reference potential, and a high voltage circuit is connected between a connection point of the medium voltage circuit and the diode and the reference potential. When the high voltage circuit is to be operated, the transistor is turned on, and a state of the switching element, and thereby, an input voltage of the transformer, is controlled based on a current flowing through the first and second resistors. When the high voltage circuit is not to be operated, the transistor is turned off, and the input voltage is controlled based on a current flowing through the second resistor.

9 Claims, 4 Drawing Sheets

HIGH-VOLTAGE POWER SUPPLY APPARATUS

BACKGROUND OF THE INVENTION

1. Field of the Invention

The present invention relates to a high-voltage power supply apparatus. More specifically, the present invention relates to a high-voltage power supply apparatus which controls supply voltages to two circuits respectively requiring voltages of different magnitudes which are both connected to an output winding of a transformer.

2. Description of the Prior Art

Conventionally, equipment requiring a relatively high medium voltage, and also a voltage that is higher than the medium voltage (hereinafter referred to as "medium voltage" and "high voltage"), for example, an electrostatic copier, electrostatic printer, electrostatic facsimile or the like, is provided with individual transformers dedicated to the medium voltage and the high voltage, respectively.

Such installation of the dedicated transformers in the respective circuit requiring the medium voltage (hereinafter referred to as "medium voltage circuit") and circuit requiring the high voltage (hereinafter referred to as "high voltage circuit") not only makes miniaturization of the power supply apparatus difficult but also raises the cost thereof.

On the other hand, power may be simply supplied simultaneously to both the medium voltage circuit and the high voltage circuit using a common transformer as shown in FIG. 1.

FIG. 1 is a circuit diagram showing an example of a conventional high-voltage power supply apparatus which is in the background of the present invention. In this conventional circuit, a medium voltage circuit 2 and a high voltage circuit 3 are commonly connected to an output side of an output winding 1a of a transformer 1 through a diode. In the case where this conventional circuit is used for the electrostatic copier, the medium voltage circuit 2 is, for example, a bias developing circuit and, the high voltage circuit 3 includes, for example, a corona discharger. When a voltage of the output side of the output winding is higher than a voltage required by the corona discharger or high voltage circuit 3, both the medium voltage circuit 2 and the high voltage circuit 3 are simultaneously operated. However, when the output voltage becomes lower than the corona discharge voltage, the high voltage circuit 3 stops operating.

In the conventional circuit as shown in FIG. 1, only a current through the high voltage circuit 3 flows through the detection resistor Rf when the high voltage circuit 3 is operated. Thus, by sensing the voltage across $R_f$, an input voltage of the transformer is able to be controlled by this current. However, since no current flows through the detection resistor Rf when the high voltage circuit 3 is turned off, it is impossible to control the input voltage at this time, when the current flows only through the medium voltage circuit 2.

SUMMARY OF THE INVENTION

Therefore, a principal object of the present invention is to provide a high-voltage power supply apparatus in which an output voltage is respectively controlled in response to a current through a medium voltage circuit or a high voltage circuit.

A high-voltage power supply apparatus in accordance with the present invention comprises, a transformer having an input winding and an output winding, a series connection of a first resistor and a switching element connected between one end of the output winding and a referential potential, a high voltage circuit connected between the other end of the output winding and the referential potential, first controlling means for turning on the switching element and for controlling an input voltage of the input winding based on a current through the first and second resistors when the high voltage circuit is to be operated, and second controlling means for turning off the switching element and for controlling the input voltage based on a current through the second resistor when the high voltage circuit is not to be operated.

When the high voltage circuit is to be operated the switching element is turned on. Accordingly, a current through the high voltage circuit flows both of the first and second resistors. On the other hand, a current through the medium voltage circuit does not flow the first and second resistors. Therefore, the input voltage is controlled based on the current of the high voltage circuit which flows through the first and second resistors, when the high voltage circuit is operated.

If the switching element is turned off, a circuit in which a current flows only the second resistor is formed, and therefore, the input voltage of the transformer is controlled based on a current through only the medium voltage circuit. If the output voltage is made lower than an operating voltage of the high voltage circuit, substantially, only the high voltage circuit can be turned off.

In accordance with the present invention, the input voltage is controlled based on the current flowing through the high voltage circuit when the medium voltage circuit and the high voltage circuit are operated and, the input voltage is controlled based on the current flowing through the medium voltage circuit when the high voltage circuit is not operated, therefore, the most suitable voltage control can be performed in the respective states or conditions.

These objects and other objects, features, aspects and advantages of the present invention will become more apparent from the following detailed description of embodiments of the present invention when taken in conjunction with the accompanying drawings.

DESCRIPTION OF THE EMBODIMENTS OF THE INVENTION

Figure 1:
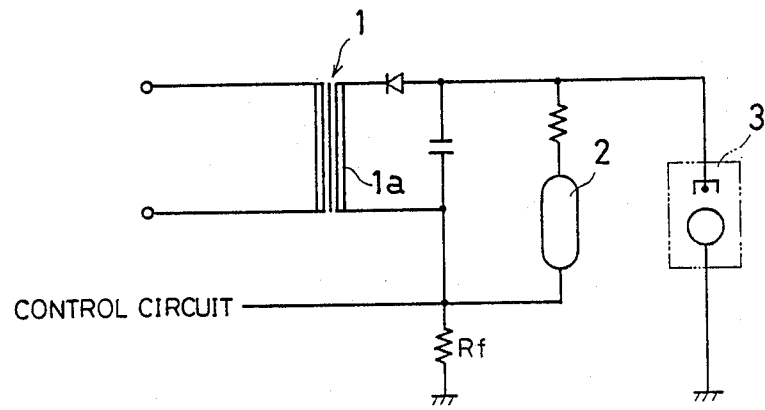
FIG. 1 is a circuit diagram showing a conventional circuit which is in the background of the present invention.
Figure 2:
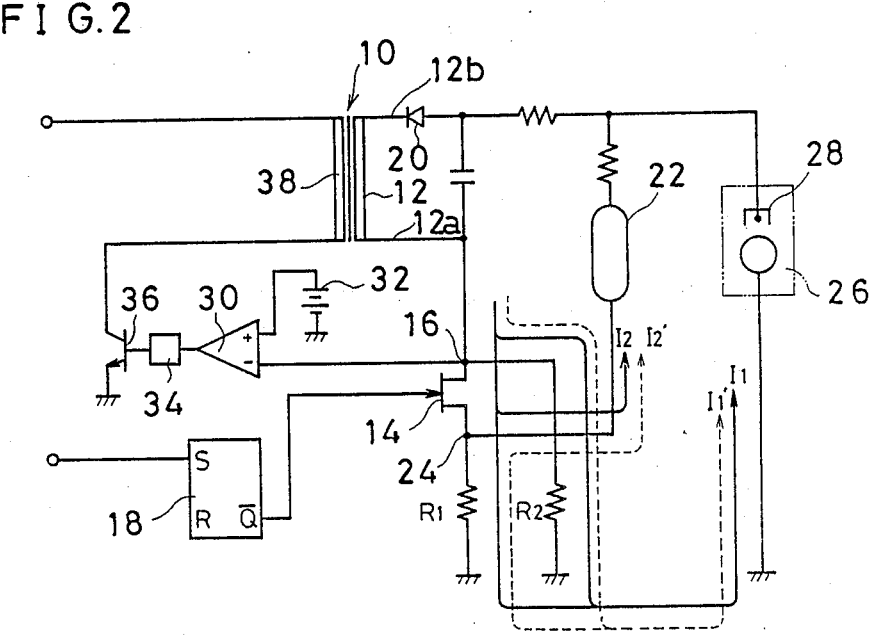
FIG. 2 is a circuit diagram showing a first embodiment of a power supply in accordance with the present invention.

FIG. 2 is a circuit diagram showing a first embodiment in accordance with the present invention. A transformer 10 includes an output winding 12. A first end 12a of the output winding 12 is connected to ground or to a reference potential through a series connection of a first resistor $R_1$ and a field effect transistor (hereinafter, "FET") 14 of an n-channel type. A second resistor $R_2$ is connected between a series connection point 16 of the first end 12a of the output winding 12 and the FET 14, and the reference potential, in parallel fashion.

An inverted output $\overline{Q}$ of a flip-flop 18 is applied to a gate of the FET 14. A set input of the flip-flop 18 is given from a control circuit (not illustrated).

A medium voltage circuit 22 including, for example, a bias developing circuit, is connected through a diode 20 of a reverse direction between the other end 12b of the output winding 12 and a connection point 24 of the FET 14 and the first resistor $R_1$. A high voltage circuit 26 includes, for example, a device in which no current flows when its input voltage is lower than its operating voltage, for example, a corona discharger 28 of an electrostatic copier. The high voltage circuit 26 is connected to ground (or reference potential) and to a resistance $R_{30}$ which leads from the diode 20. The medium voltage circuit 22 is connected to the resistance $R_{30}$ by a resistance $R_{40}$, and also to ground or the reference potential.

The connection point 16 of the first end 12a of the output winding 12 and the FET 14 is further connected to a ($-$) terminal of a voltage comparator 30. To a ($+$) terminal of the voltage comparator 30, a comparative reference voltage source 32 is connected. An output terminal of the voltage comparator 30 is connected to a base of an npn transistor 36 through a suitable oscillator-amplifier circuit 34. More specifically, the voltage comparator 30 outputs a voltage having a level varying in accordance with the difference between its two input voltages. This output voltage of the voltage comparator 30 is given to the oscillator-amplifier circuit 34. The oscillator-amplifier circuit 34 outputs a control signal having a voltage level proportional to the level of the voltage inputted from the voltage comparator 30. The control signal is applied to the base of the transistor 36. Accordingly, the transistor 36 repetitively turn on and turns off in response to the level of the control signal. Consequently, an AC input voltage having a magnitude in accordance with the control signal is generated at an input winding 38 of the transformer 10. Accordingly, by adequately regulating the turned-on or turned-off state of the transistor 36, that is, by controlling the amount of the current of the input winding 38, the magnitude of the output voltage from the output winding 12 can be regulated.

In the FIG. 2 embodiment, when an AC voltage is generated at the input winding 38 by switching the transistor 36, a voltage is induced in the output winding 12, and this induced voltage is rectified by the diode 20, being withdrawn as an output voltage of negative polarity from the second end 12b of the output winding 12.

When operating not only the medium voltage circuit 22 but also the high voltage circuit 26, the flip-flop 18 is reset by a signal from the control circuit (not illustrated). Responsively, the inverted output $\overline{Q}$ of the flop-flop 18 becomes a high level, and the FET 14 is turned on. Therefore, a current $I_1$ of the high voltage circuit 26 flows through both the first resistor $R_1$ and the second resistor $R_2$ as shown by the solid-line arrow in FIG. 2.

On the other hand, a current $I_2$ of the medium voltage circuit 22 directly flows through the drain and source of the FET 14 but not through the above-described two resistors $R_1$ and $R_2$.

Therefore, by detecting a voltage $V_{16}$ at the connection point 16 by means of the voltage comparator 30, it is possible to detect only the current through the first resistor $R_1$ and the second resistor $R_2$, that is, the current $I_1$ flowing through the high voltage circuit 26. On the other hand, the current $I_2$ of the medium voltage circuit 22 does not affect the voltage $V_{16}$ at the connection point 16. Thus, the voltage comparator 30 responds to only the current flowing through the high voltage circuit 26, when the high voltage circuit 26 is operated. At that time, by means of the voltage comparator 30, the input voltage of the transformer 10 may be controlled by controlling the transistor 36 so that the voltage $I_1 \cdot \{R_1 R_2 / (R_1 + R_2)\}$ becomes constant. Also at that time, if the magnitude of the output voltage is set to be higher than the operating voltage of the corona discharger 28 included in the high voltage circuit 26, both of the medium voltage circuit 22 and the high voltage circuit 26 are operable.

Next, in order to make the high voltage circuit 26 not operate, the flip-flop 18 is set by the control signal. Responsively, a non-inverted output becomes a high level, and the inverted output $\overline{Q}$ becomes a low level. Therefore, the FET 14 is turned off. In this state, a current $I_2'$ flows through the medium voltage circuit 22 as shown by a dotted-line arrow. That is, the current $I_2'$ of the medium voltage circuit 22 flows only through the second resistor $R_2$. Accordingly, the voltage $V_{16}$ at the connection point 16 depends on only the current $I_2'$ flowing through the second resistor $R_2$ since, as explained below, the high voltage circuit 26 is in the non-operated state.

The voltage comparator 30 controls the transistor 36 in accordance with the voltage $V_{16}$ at the connection point 16 so that the voltage $(I_1' + I_2')R_2$ becomes constant.

If, under these conditions, the output voltage from the second end 12b of the output winding 12 is set to be lower than the discharge starting voltage (for example 2 kV) of the corona discharger 28 included in the high voltage circuit 26, the current $I_1'$ becomes zero and therefore, the high voltage circuit 26 is turned off. Thus, the high voltage circuit 26 is not operated, and the input voltage of the transformer 10 is controlled only by the current $I_2'$ flowing through the medium voltage circuit 22.

In addition, when the FET 14 is turned on or turned off the voltage from the output winding 12 of the transformer 10 is varied. For this reason, in the medium voltage circuit 22, a voltage regulator may be installed as required.

Figure 3:
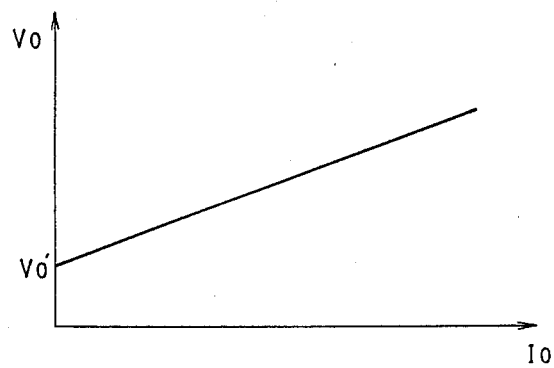
FIG. 3 is a graph showing a current-voltage characteristic of the FIG. 2 embodiment.

In summary, in the of FIG. 2, the high voltage circuit includes the corona discharger 28, which does not operate below a given voltage Vo' as shown in FIG. 3, resulting in that no current $I_1'$ flows. Therefore, if when the FET 14 is turned off, the output voltage from the second end 12b is set to be lower than Vo' so that $I_1'$ of $(I_1' + I_2')R_2$ becomes zero, only the medium voltage circuit 22 is operable. Therefore, by turning on or off the FET 14 it is possible to turn on or turn off only the high voltage circuit 26.

By such relationship, in the embodiment of FIG. 2, the operating voltage of the medium voltage circuit 22 must be lower than the voltage at which the corona discharger 28 can start to discharge.

Figure 4:
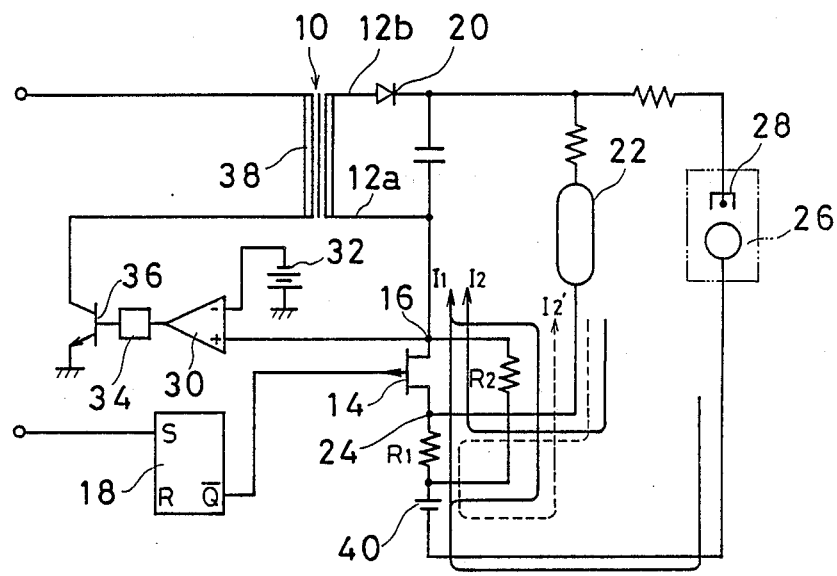
FIG. 4 is a circuit diagram showing a second embodiment of a power supply in accordance with the present invention.

FIG. 4 is circuit diagram showing another second embodiment. This embodiment differs from FIG. 2 embodiment in that a polarity of the output voltage is reverse.

In FIG. 4, a first end 12a of the output winding 12 of the transformer 10 is connected to a voltage source 40 for forming a reference voltage Vk through a series connection of a p-channel FET 14 and a first resistor $R_1$. A second resistor $R_2$ is connected in parallel with the series connection of the FET 14 and the first resistor $R_1$.

An inverted output $\overline{Q}$ of the flip-flop 18 is given to a gate of the FET 14, as in the FIG. 2 embodiment.

The medium voltage circuit 22 is connected through the diode 20 of the forward direction between a second end 12b of the output winding 12 and a connection point 24 of the FET 14 and the first resistor $R_1$. The high voltage circuit 26 including the corona discharger 28 is connected to the reference potential, and is also connected by a resistance $R_{50}$ to a connection point of the diode 20 and a resistance $R_{40}$ which leads from the diode 20 to the medium voltage circuit 22.

The operation of the FIG. 4 embodiment is substantially equivalent to that of the FIG. 2 embodiment, except that the polarity is reversed, and that reference voltage Vk is added (or subtracted) to or from the voltage $V_{16}$ at the connection point 16. Therefore, a duplicate description is omitted here.

Figure 5:
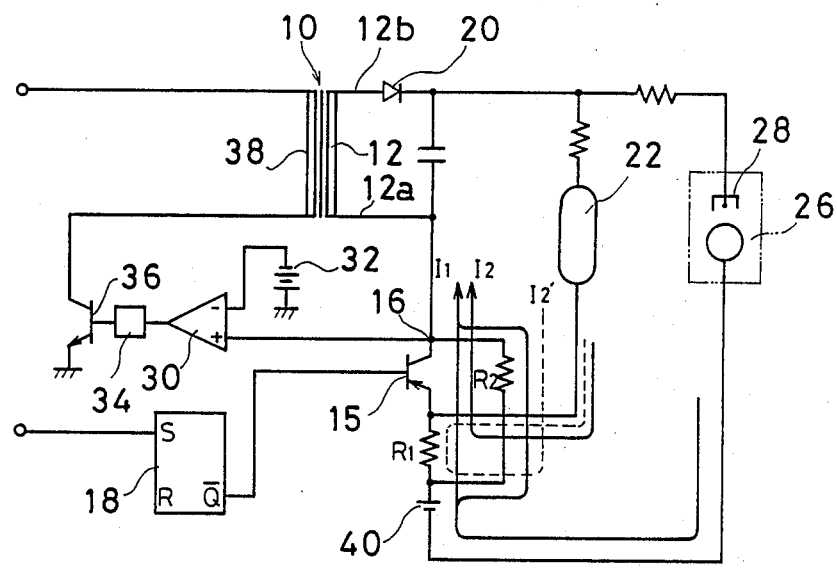
FIG. 5 is a circuit diagram showing a modified example of the FIG. 4 embodiment.

The FIG. 4 embodiment may be modified as shown in FIG. 5. In the FIG. 5 embodiment, instead of the FET 14 of FIG. 4, a pnp transistor 15 is used.

Figure 6:
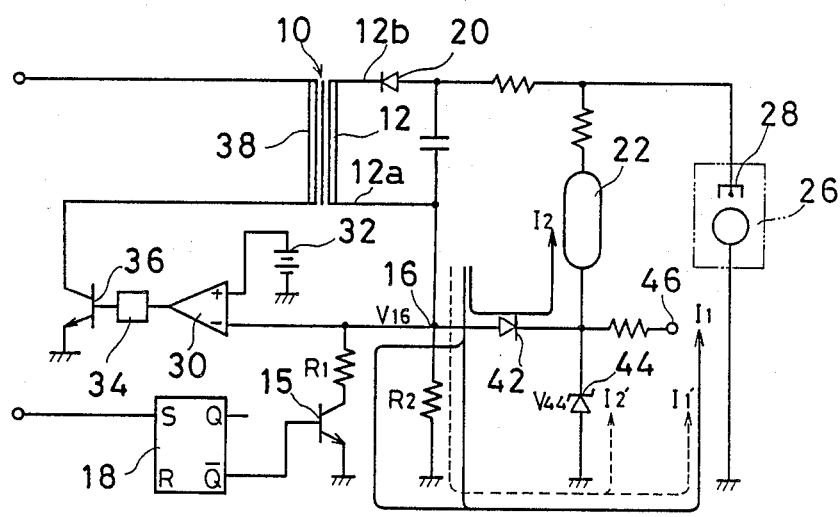
FIG. 6 is a circuit diagram showing a third embodiment of a power supply in accordance with the present invention.

FIG. 6 is a circuit diagram showing a third embodiment of a power supply in accordance with the present invention. This embodiment substantially differs from the FIG. 2 embodiment in the following point. More specifically, an anode of a diode 42 is connected to the connection point 16, the medium voltage circuit 22 being connected an cathode of the diode 42. A connection point of the diode 42 and the medium voltage circuit 22 is grounded through a cathode and an anode of a zener diode 44. A connection point of the diode 42 and the medium voltage circuit 22 is also connected to a bias terminal 46 through a suitable resistor. To the bias terminal 46, the non-inverted output Q of the flip-flop 18 is applied.

In addition, instead of the n-channel FET 14 as shown in FIG. 2, an npn transistor 15 is used as a switching element.

When both of the medium voltage circuit 22 and the high voltage circuit 26 are to be operated, the flip-flop 18 is reset by the signal from the control circuit. Responsively, the inverted output $\overline{Q}$ of the flip-flop 18 becomes a high level, and therefore, the transistor 15 is turned on. At this time, the non-inverted output Q of the flip-flop 18 being at a low level, no positive voltage is applied to the bias terminal 46. In that state, the voltage $V_{16}$ at the connection point 16 is smaller than the voltage $V_{44}$ of the zener diode 44 ($V_{16} < V_{44}$), and accordingly, no current flows through the zener diode 44. Therefore, the current $I_1$ of the high voltage circuit 26 flows through the first resistor $R_1$ and the second resistor $R_2$ as shown by the solid-line arrow in FIG. 6.

On the other hand, in that state, the current $I_2$ of the medium voltage circuit 22 flows through the diode 42 as shown by the solid-line arrow, since the diode 42 is made conductive. Therefore, the current $I_2$ does not pass through any of the above-described two resistors $R_1$ and $R_2$.

Meanwhile, as described above, even if the transistor 15 does turned on, the base current thereof is not affect the detected voltage $V_{16}$. The reason is that the first resistor $R_1$ is connected to a point having higher potential than the point to which the base of the transistor 15 is connected. Therefore, only the current $I_1$ is detected by the resistor $R_1$.

On the other hand, when the high voltage circuit is not to be operated, the flip-flop 18 is set by the control signal. Accordingly, the transistor 15 is turned off and the positive voltage or the high level is applied to the bias terminal 46. Therefore, the zener diode 44 is turned on. In this state, the current $I_2'$ through the medium voltage circuit 26 flows through the second resistor $R_2$ and the zener diode 44, and therefore, the voltage $V_{16}$ depends on only the current $I_2'$ flowing through the second resistor $R_2$.

Then, switching control of the input winding 38 of the transformer 10 is performed by the voltage comparator 30 and the transistor 38, as described previously.

Figure 7:
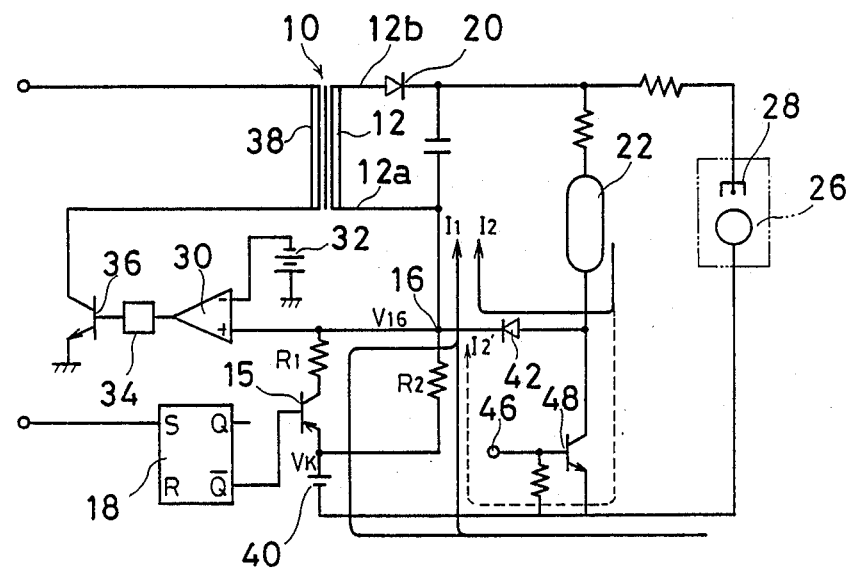
FIG. 7 is a circuit diagram showing a fourth embodiment of a power supply in accordance with the present invention.

FIG. 7 is a circuit diagram showing a fourth embodiment of a power supply in accordance with the present invention. In comparison with the FIG. 6 embodiment, in this embodiment, the polarity of the output voltage is reversed, and accordingly, the zener diode 44 as a voltage responsive element is replaced with a transistor 48.

Also, if switching means for the medium voltage circuit 22 is provided in connection with the same, only the medium voltage circuit can be turned off independently from the high voltage circuit 26.

Furthermore, the above-described embodiments of the present invention have been described as examples used for the power supply apparatus for the electrostatic copier and so on. However, needless to say, the present invention can be utilized as an arbitrary power supply apparatus which supplies power to both the medium voltage circuit and the high voltage circuit from the common transformer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A high-voltage power supply apparatus, comprising:
   a transformer having an input winding and an output winding,
   a series connection of a first resistor and a switching element, said series connection being connected between one end of said output winding and a reference potential,
   a second resistor connected in parallel with said series connection,
   a medium voltage circuit connected between the other end of said output winding and the reference potential,
   a high voltage circuit connected in parallel with said medium voltage circuit,
   control means for turning on said switching element and for controlling an input voltage of said input winding based on a current flowing through said first and second resistors, when said high voltage circuit is operated, and for turning off said switching element and for controlling said input voltage of said input winding based on a current flowing through said second resistor, when said high voltage circuit is not operated.

2. A high-voltage power supply apparatus in accordance with claim 1, further comprising a diode connected between said other end of said output winding and both of said medium voltage circuit and said high voltage circuit.

3. A high-voltage power supply apparatus in accordance with claim 1, wherein said switching element includes a transistor.

4. A high-voltage power supply apparatus in accordance with claim 3, wherein said transistor includes a field effect transistor.

5. A high-voltage power supply apparatus in accordance with claim 1, wherein said control means include a voltage comparator which receives a detected voltage and the reference potential, and switching means for switching a circuit including said input winding in response to an output of said voltage comparator.

6. A high-voltage power supply apparatus in accordance with claim 1, wherein said high voltage circuit includes a corona discharger, and wherein said control means is further for controlling an output voltage of said output winding in response to a current flowing through said second resistor so that said output voltage becomes lower than a voltage at which said corona discharger starts to discharge.

7. A high-voltage power supply apparatus in accordance with claim 1, further comprising
a diode connected between a connection point of said series connection and said medium voltage circuit,
a voltage responsive element connected between a connection point of said medium voltage circuit and said diode and the reference potential, and
means for applying a reverse bias to said diode when said high voltage circuit is not operated.

8. A high-voltage power supply apparatus in accordance with claim 7, wherein said voltage responsive element includes a zener diode.

9. A high-voltage power supply apparatus in accordance with claim 7, wherein said voltage responsive element includes a transistor.

* * * * *